United States Patent
Baysinger et al.

(10) Patent No.: US 11,501,059 B2
(45) Date of Patent: Nov. 15, 2022

(54) METHODS AND SYSTEMS FOR AUTO-FILLING FIELDS OF ELECTRONIC DOCUMENTS

(71) Applicant: INTERNATIONAL BUSINESS MACHINES CORPORATION, Armonk, NY (US)

(72) Inventors: Bryan Baysinger, Atlanta, GA (US); Shikhar Kwatra, Durham, NC (US); Sarbajit Rakshit, Kolkata (IN); John Wilson, League City, TX (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 16/245,216

(22) Filed: Jan. 10, 2019

(65) Prior Publication Data
US 2020/0226209 A1    Jul. 16, 2020

(51) Int. Cl.
*G06F 40/174*    (2020.01)
*G06F 16/9535*   (2019.01)
*G06F 16/31*     (2019.01)

(52) U.S. Cl.
CPC .......... *G06F 40/174* (2020.01); *G06F 16/313* (2019.01); *G06F 16/9535* (2019.01)

(58) Field of Classification Search
CPC ... G06F 40/174; G06F 16/313; G06F 16/9535
USPC ....................................................... 715/226
See application file for complete search history.

(56) References Cited

U.S. PATENT DOCUMENTS

| 7,685,144 | B1* | 3/2010 | Katragadda | G06F 40/274 |
| | | | | 707/999.101 |
| 7,908,287 | B1* | 3/2011 | Katragadda | G06F 3/0237 |
| | | | | 707/767 |
| 8,868,592 | B1* | 10/2014 | Weininger | G06F 16/3322 |
| | | | | 707/767 |
| 2005/0257134 | A1* | 11/2005 | Goodman | G06F 40/174 |
| | | | | 715/226 |
| 2010/0120401 | A1* | 5/2010 | Mears | H04W 4/20 |
| | | | | 455/414.1 |
| 2013/0339030 | A1* | 12/2013 | Ehsani | G10L 17/00 |
| | | | | 704/275 |
| 2015/0067487 | A1 | 3/2015 | Rajamony et al. | |
| 2015/0248391 | A1* | 9/2015 | Watanabe | G06F 16/9554 |
| | | | | 715/226 |

(Continued)

OTHER PUBLICATIONS

S. Wang, Y. Zou, B. Upadhyaya and J. Ng, "An Intelligent Framework for Auto-filling Web Forms from Different Web Applications," 2013 IEEE Ninth World Congress on Services, Santa Clara, CA, 2013, pp. 175-179, doi: 10.1109/SERVICES.2013.19. (Year: 2013).*

*Primary Examiner* — Stephen S Hong
*Assistant Examiner* — Broderick C Anderson
(74) *Attorney, Agent, or Firm* — Griffiths & Seaton PLLC (57) ABSTRACT

Embodiments for managing an electronic document by one or more processors are described. An entry for a first of a plurality of fillable fields of an electronic document is received. A recommended entry for at least a second of the plurality of fillable fields is determined based on at least one data source associated with a user. A signal representative of the determined recommended entry for the at least a second of the plurality of fillable fields is generated.

21 Claims, 7 Drawing Sheets

(56) References Cited

U.S. PATENT DOCUMENTS

| | | | |
|---|---|---|---|
| 2015/0248392 A1* | 9/2015 | Watanabe | G06F 16/955 |
| | | | 715/226 |
| 2015/0248393 A1* | 9/2015 | Watanabe | G06F 40/174 |
| | | | 715/226 |
| 2016/0021249 A1 | 1/2016 | Govande et al. | |
| 2016/0224524 A1 | 8/2016 | Kay et al. | |
| 2017/0249059 A1* | 8/2017 | Houseworth | G06F 16/2428 |
| 2018/0181866 A1 | 6/2018 | Dalle et al. | |
| 2018/0181928 A1 | 6/2018 | Woo | |
| 2018/0296092 A1* | 10/2018 | Hassan | G10L 25/66 |
| 2019/0188251 A1* | 6/2019 | Liu | G06F 16/9532 |
| 2020/0026778 A1* | 1/2020 | Miller | G06F 3/0237 |

* cited by examiner

| | A 502 | B | C |
|---|---|---|---|
| 1 | JOHN | | |
| 2 | MATT | | |
| 3 | *ERIC* | | |
| 4 | *MARK* | | |
| 5 | *FRED* | | |
| 6 | *BILL* | | |
| 7 | *TIM* —504 | | |
| 8 | *AARON* | | |
| 9 | | | |
| 10 | | | |
| 11 | | | |

METHODS AND SYSTEMS FOR AUTO-FILLING FIELDS OF ELECTRONIC DOCUMENTS

BACKGROUND OF THE INVENTION

Field of the Invention

The present invention relates in general to computing systems, and more particularly, to various embodiments for managing electronic documents with an auto-fill functionality of fields.

Description of the Related Art

In recent years, the use of various types of electronic documents, such as spreadsheets, online forms, tables, etc., has increased dramatically. People from all walks of life now encounter and/or work with such documents in various ways, such as creating spreadsheets, filling out government forms, online shopping, when visiting a doctor, etc.

Completing such documents can be time consuming and frustrating, particularly in instances in which the documents are relatively complex (e.g., there are many fields that need to be filled/completed) and/or when the same sorts of information is required for multiple documents (e.g., an individual has to complete multiple, similar documents in a relatively short amount of time).

SUMMARY OF THE INVENTION

Various embodiments for managing electronic documents by one or more processors are described. In one embodiment, by way of example only, a method for managing an electronic document, again by one or more processors, is provided. An entry for a first of a plurality of fillable fields of an electronic document is received. A recommended entry for at least a second of the plurality of fillable fields is determined based on at least one data source associated with a user. A signal representative of the determined recommended entry for the at least a second of the plurality of fillable fields is generated.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

As discussed above, in recent years, the use of various types of electronic documents, such as spreadsheets, forms, tables, etc., has increased dramatically. People from all walks of life now encounter and/or work with such documents in various ways, such as creating spreadsheets, filling out government forms, online shopping, when visiting a doctor, etc.

Completing such documents can be time consuming and frustrating, particularly in instances in which the documents are relatively complex (e.g., there are many fields that need to be filled/completed) and/or when the same sorts of information is required for multiple documents (e.g., an individual has to complete multiple, similar documents in a relatively short amount of time).

For example, consider a scenario in which an individual is creating a spreadsheet related to expenses of a group trip or vacation (i.e., a trip that included multiple friends of the user). The individual may be creating the spreadsheet to show the other members of the group a "breakdown" of the expenses so that the other members will have a good understanding of what the trip will cost each of them (and/or how much the trip costs, if the trip was already taken). When creating the spreadsheet, the individual may have to manually enter the names of all of the members of the group, as well as particular items related to the trip (e.g., hotel, manner of travel, food, etc.).

As another example, consider a scenario in which an individual is undergoing extensive medical treatment that includes seeing multiple doctors within a relatively short period of time (e.g., a week). On the first visit to each of the doctors, they may have to fill out a form that includes general information about them (e.g., name, age, etc.), as well as more detailed information, such as relating to their symptoms and/or previous medical history.

Thus, there is a need for methods and systems for managing electronic documents that implement an intelligent auto-fill functionality that assists user in filling out or completing the documents.

To address these needs, some embodiments described herein provide methods and systems for managing electronic documents that utilize cognitive heuristics, a cognitive analysis with respect to a user (e.g., the individual filling out or creating the electronic document or an individual associated with the electronic document), and/or the contextual situation of the user to provide a dynamic auto-fill functionality. It should be understood that the methods and systems described herein may be applied to any sort of electronic document that has one or more Tillable fields (e.g., text boxes), such as spreadsheets, word processing documents, slide presentations, and various types of forms (e.g., online forms, forms accessible through a software application, etc.).

In some embodiments, various types of data (e.g., structured data and/or unstructured data) associated with a user (or individual) is collected and/or monitored (e.g., by an information engine). The data may be collected from various types of data sources and/or sensors associated with the user and may be stored (e.g., as a profile or cognitive profile of the user). The data utilized may include data that was not previously explicitly entered by the user into a computing node (e.g., electronic forms that the user previously completed). In some embodiments, the data includes unstructured data that may be collected from various sources, including sensors. A data engine may process at least some of the data (one or more sets of the data) to organize (or convert) the data (e.g., unstructured data) into a structured format (or structured data). An implementation engine may apply the structured data to an electronic document and output the appropriate data into fillable fields of the electronic document (e.g., as entries for the fields). At least some of the functionality of the methods and systems described herein may be performed utilizing a cognitive analysis.

In other words, in some embodiments, a cognitive module may be used to analyze various data sources associated with the user (e.g., to generate a cognitive profile of the user). The data sources (and/or the cognitive profile) may be utilized to generate recommended entries for fillable fields on electronic documents. For example, when the system detects that the user is interacting with an electronic document and/or that the user has generated an entry (or at least a partial entry) for some (e.g., one) of the fillable fields on the electronic document, the system may utilize the various data associated with the user, perhaps along with the user-generated entry and/or information associated with the electronic document (e.g., the type or title of an electronic form), to generate (or determine) recommended entries for at least some of the other fillable fields on the electronic document. The recommended entries may be then rendered in the appropriate fields. In some embodiments, the recommended entries are (at least initially/temporarily) rendered in a manner different than the user-generated entry (or entries) (e.g., the recommended entries are shown in a different color than the user-generated entry).

The user may then provide an indication as to whether or not he/she accepts or rejects the recommended entries. If accepted, the recommended entries may (then) be rendered in the same manner as the user-generated entry and be made (or become) "permanent" entries (which may later be modified or deleted by the user in some embodiments).

The data source(s) utilized may include, for example, any available data sources associated with the user (i.e., the individual interacting with the electronic document or an individual associated with the electronic document). For example, in some embodiments, a profile (e.g., a cognitive profile) for the user(s) may be generated. Data sources that may be use used to generate a cognitive profile for the user(s) may include any appropriate data sources associated with the user that are accessible by the system (perhaps with the permission or authorization of the user). Examples of such data sources include, but are not limited to, communication sessions and/or the content (or communications) thereof (e.g., phone calls, video calls, text messaging, emails, in person/face-to-face conversations, etc.), a profile of (or basic information about) the user (e.g., job title, place of work, length of time at current position, family role, etc.), a schedule or calendar (i.e., the items listed thereon, time frames, etc.), projects (e.g., past, current, or future work-related projects), location (e.g., previous and/or current location and/or location relative to other users), social media activity (e.g., posts, reactions, comments, groups, etc.), browsing history (e.g., web pages visited), online purchases, and medical records. In some embodiments, at least some of the data utilized is collected or detected by various types of sensors and devices, such as cameras, microphones, biometric sensors (e.g., on a mobile electronic device, such as a smart watch), motion sensors, positioning systems (e.g., GPS), wireless transceivers (e.g., to detect the presence of computing devices associated with the individuals), etc.

In some embodiments, the data utilized may be structured (or collected from structured data sources) and/or unstructured (or collected from unstructured data sources), as is commonly understood in the art. For example, structured sources of information or data may include relational databases, spreadsheets, etc. (human-generated and/or machine-generated). Unstructured sources may include human-generated data, such as text files, social media posts, audio and/or video files, digital photos, as well as machine-generated data, such as sensor data (e.g., from cameras, microphones, biometric sensors, etc).

In some embodiments, the methods and systems described herein utilize a cognitive analysis that is performed on the available data sources. The cognitive analysis may also include classifying natural language, analyzing tone, and analyzing sentiment (e.g., scanning for keywords, key phrases, etc.) with respect to, for example, communications associated with the user and/or other available data sources. In some embodiments, natural language processing (NLP), Mel-frequency cepstral coefficients (MFCCs), and/or region-based convolutional neural network (R-CNN) pixel mapping (e.g., for object detection), as are commonly understood, are used. Over time, the methods and systems described herein may determine correlations (or insights) between the data associated with the user(s) and the recommended entries, perhaps with feedback provided by the users, allowing for the performance of the system to improve with continued use.

As such, in some embodiments, the methods and/or systems described herein may utilize a "cognitive analysis," "cognitive system," "machine learning," "cognitive modeling," "predictive analytics," and/or "data analytics," as is commonly understood by one skilled in the art. Generally, these processes may include, for example, receiving and/or retrieving multiple sets of inputs, and the associated outputs, of one or more systems and processing the data (e.g., using a computing system and/or processor) to generate or extract models, rules, etc. that correspond to, govern, and/or estimate the operation of the system(s), or with respect to the embodiments described herein, the management of electronic documents as described herein. Utilizing the models, the performance (or operation) of the system (e.g., utilizing/based on new inputs) may be predicted and/or the performance of the system may be optimized by investigating how changes in the input(s) effect the output(s).

In some embodiments, software installed on one or more computing devices associated with the user (e.g., a mobile electronic device) and/or a cognitive module (or control system) gathers and/or monitors data from various sources associated with the user, as described above, such as the user's activity, mobility pattern, and information related to other individuals (e.g., contacts, friends, etc.). The system may create a set of data associated with the user, categorize the data, and utilize it as candidate data (or recommended entries) for auto-filling fields in electronic documents. The system and/or the user's device may recognize the user's location (e.g., via GPS) to, for example, generate a set of data related to the location (and/or an electronic document with which the user is interacting).

For example, the system may determined that the user is at a doctor's office, which may be translated to a set of data associated with the doctor (e.g., name, specialty, etc.) via, for example, online data sources (e.g., information about the doctor associated with the location/address). The user may be provided with an indication of the data to confirm the accuracy thereof (e.g., via a mobile electronic device or other computing node). In embodiments related to medical treatment, when the user is provided with an electronic document (e.g., a new patient form on a computing device), the recommended entries for the form may include a standardized list of possible treatments (e.g., based on the doctor's specialty). In some embodiments, the data sources may include data related to symptoms of the user (e.g., as collected by various sensors), such as multiple trips to the restroom, the sound of vomiting, changes in activity level, etc. Such data may be saved/tagged as symptoms that may be utilized as recommended entries on the electronic document. Additionally, emergency contacts for the user may be derived from the user's contacts (e.g., phone numbers, emails, via social media, etc.), which may also be utilized as recommend entries. Biometric data detected by, for example, wearable devices, such as heart rate, blood pressure, body temperature, blood sugar levels, etc., may also be utilized for recommended entries. Additionally, information associated with the user's medical insurance provider (e.g., listed on a website) may also be utilized. Also, data collected via explicit input from the user, such as responses to queries (e.g., with respect to pain level) may be utilized.

In some embodiments, when the user begins to create entries for the fields of the electronic document, the system may identify related information about the identified categories and utilize such to create recommended entries in at least some of the fields of the document (e.g., the system begins auto-filling the document). In addition to the various data sources associated with the user, the user-generated entries (i.e., the content thereof) and/or information related to the electronic document may be utilized to, for example, gain an understanding of the type of recommended entries that are suitable for the particular electronic document. For example, if the electronic document is related to medicine, keywords in the user-generated entries and/or associated with (or otherwise located on the document) may indicate such and facilitate the system in utilizing the appropriate data associated with the user.

In some embodiments, methods (and/or systems) for applying cognitive heuristics to input objects (or entries for electronic document fields) are provided. Data associated with a user is accumulated (e.g., by an information engine or cognitive module). The data may be collected for various data sources associated with the user, including various types of sensors, and stored. The data may be accessed and processes to organize the data into a structured format. The data may be processed (e.g., by a data engine or cognitive module) and output (e.g., by an implementation engine or cognitive module) an (recommended) entries for fillable fields on electronic documents.

The user's behavior, activity, and/or data may be monitored to improve the performance over time. Structured queries may be utilized to collect data about (or from) the user. The data may be stored in a temporary memory for instantaneous processing. A cognitive analysis or neural network may be utilized, which may implement self-learning processing (and/or utilize user feedback) to improve the performance of the system over time.

In particular, in some embodiments, a method for managing an electronic document by one or more processors is provided. An entry for a first of a plurality of fillable fields of an electronic document is received. A recommended entry for at least a second of the plurality of fillable fields is determined based on at least one data source associated with a user. The at least one data source may include unstructured data. A signal representative of the determined recommended entry for the at least a second of the plurality of fillable fields is generated.

The determined recommended entry for the at least a second of the plurality of fillable fields may be caused to be rendered within the at least a second of the plurality of fillable fields. The unstructured data may be converted into a structured format.

The determining of the recommended entry for the at least a second of the plurality of fillable fields may be further based on the received entry for the first of the plurality of fillable fields. The determining of the recommended entry for the at least a second of the plurality of fillable fields may be performed utilizing a cognitive analysis. The determining of the recommended entry for the at least a second of the plurality of fillable fields may include determining a recommended entry for each of the others of the plurality of fillable fields.

The at least one data source associated with the user may include at least one of electronic communications, social media activity, and data collected by sensors. An indication of acceptance (or rejection) of the determined recommended entry for the at least a second of the plurality of Tillable fields may be received.

It should be understood that as used herein, the term "computing node" (or simply "node") may refer to a computing device, such as a mobile electronic device or a desktop computer, and/or an application, such as word processing application, spreadsheet application, an email application, a social media application, a web browser, etc. In other words, as used herein, examples of computing nodes include, for example, computing devices such as mobile phones, tablet devices, desktop computers, or other devices, such as appliances (IoT appliances) that are owned and/or otherwise associated with individuals (or users), and/or various applications that are utilized by the individuals on such computing devices.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment, such as cellular networks, now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
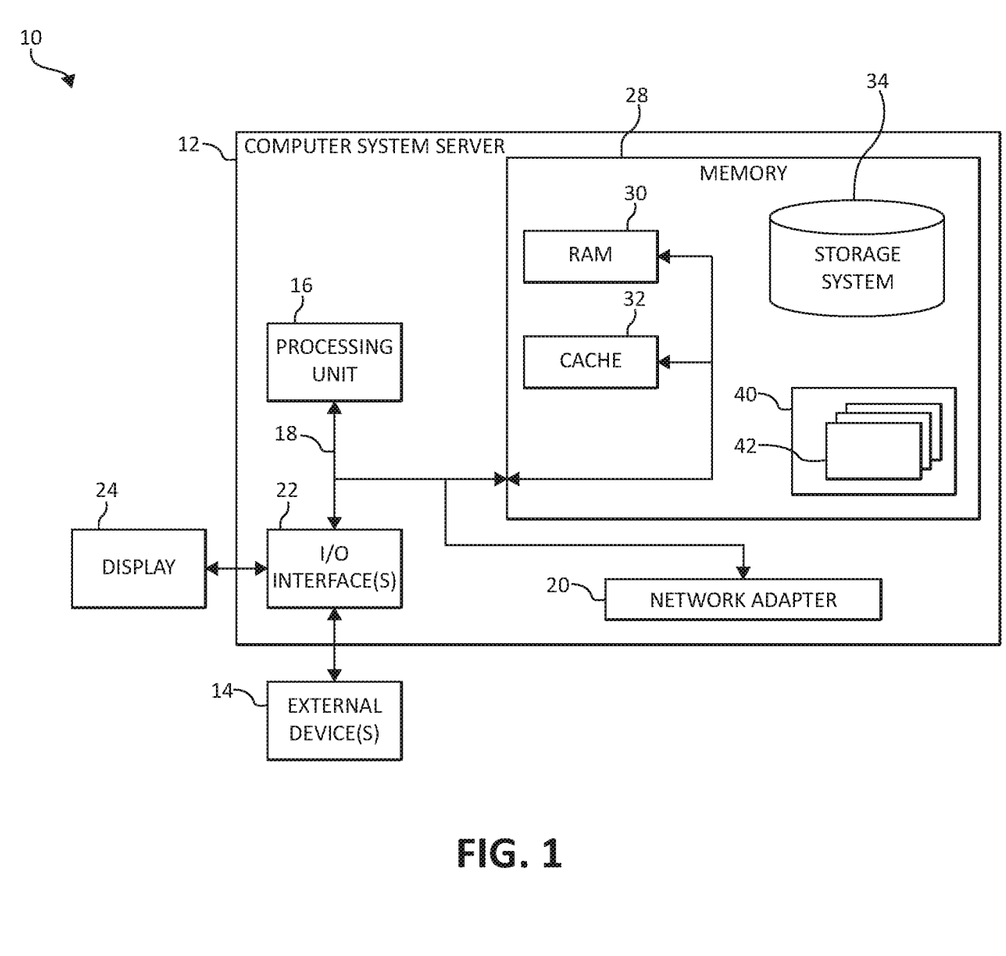
FIG. 1 is a block diagram depicting an exemplary computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, server computer systems, thin clients, thick clients, hand-held or laptop devices, multiprocessor systems, microprocessor-based systems, set top boxes, programmable consumer electronics, network PCs, mobile electronic devices such as mobile (or cellular and/or smart) phones, personal data assistants (PDAs), tablets, wearable technology devices, laptops, handheld game consoles, portable media players, etc., as well as computing systems in vehicles, such as automobiles, aircraft, watercrafts, etc., and/or any other computing node through which a user may interact with an electronic document. However, in some embodiments, some of the components depicted in FIG. 1 may be located in a computing device in, for example, a satellite, such as a Global Position System (GPS) satellite. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
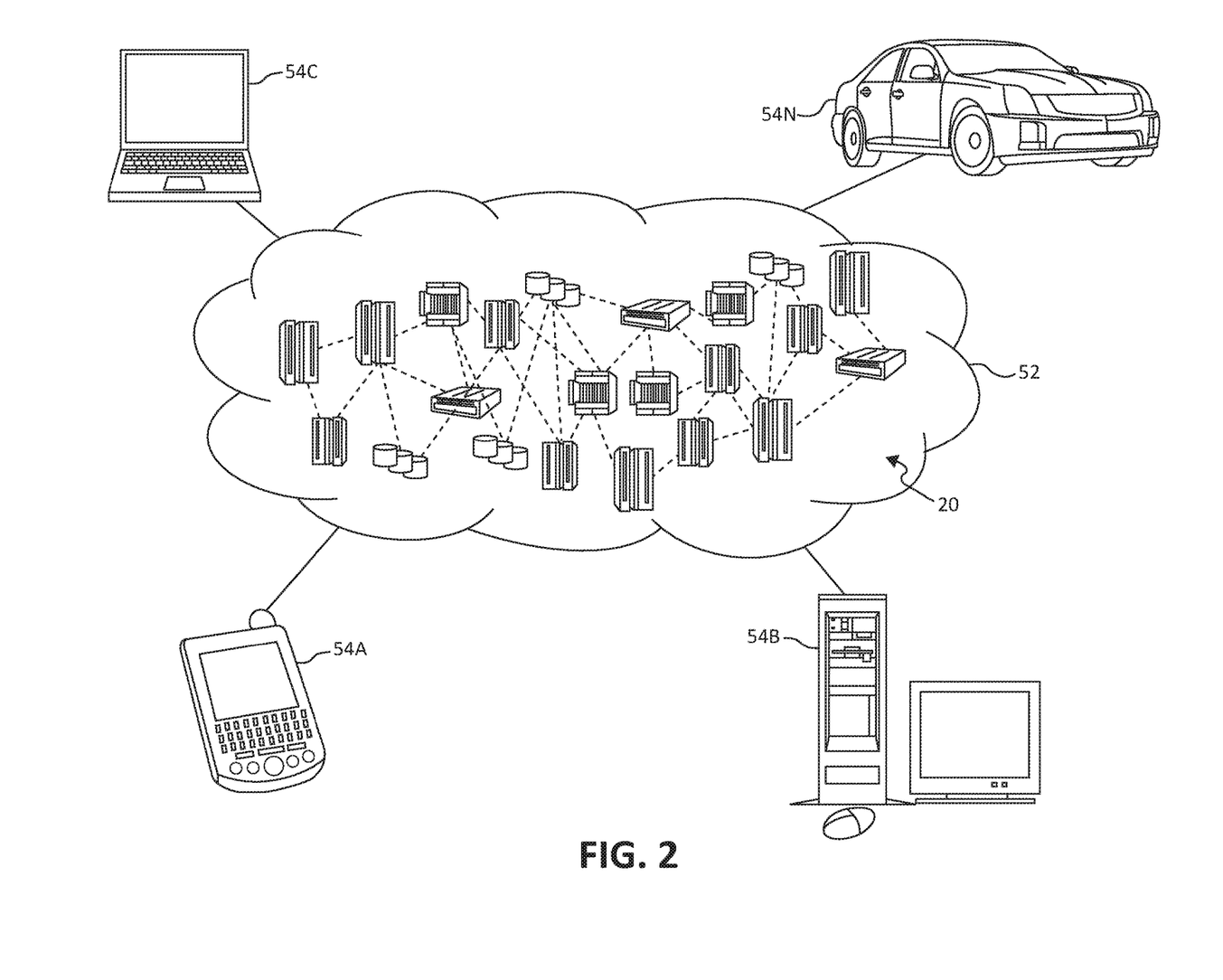
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, cellular (or mobile) telephone or PDA 54A, desktop computer 54B, laptop computer 54C, and vehicular computing system (e.g., integrated within automobiles, aircraft, watercraft, etc.) 54N, may communicate.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
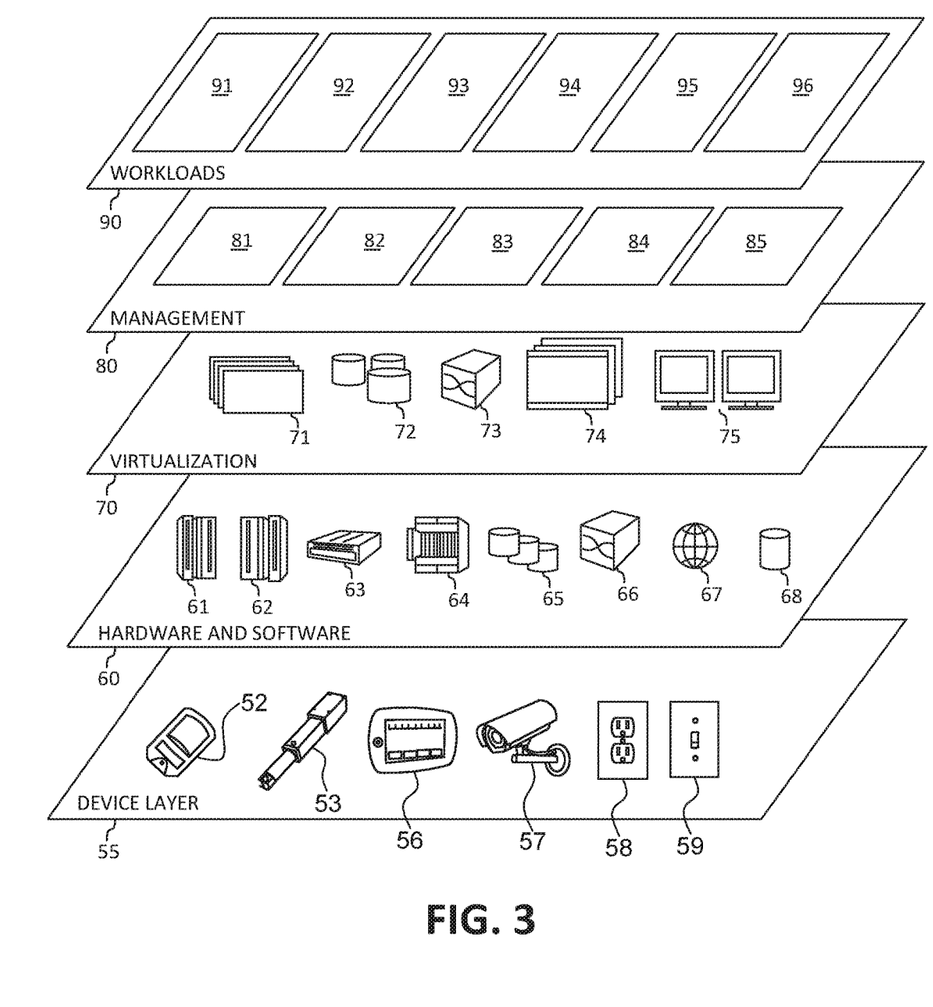
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, various additional sensor devices, networking devices, electronics devices (such as a remote control device), additional actuator devices, so called "smart" appliances such as a refrigerator, washer/dryer, or air conditioning unit, and a wide variety of other possible interconnected devices/objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for managing electronic documents as described herein. One of ordinary skill in the art will appreciate that the workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, in some embodiments, a cognitive module (or analysis) may be used to analyze various data sources associated with the user (e.g., to generate a cognitive profile of the user). The data sources (and/or the cognitive profile) may be utilized to generate recommended entries for fillable fields on electronic documents. For example, when the system detects that the user is interacting with an electronic document and/or that the user has generated an entry (or at least a partial entry) for some (e.g., one) of the fillable fields on the electronic document, the system may utilize the various data associated with the user, perhaps along with the user-generated entry and/or information associated with the electronic document (e.g., the type or title of an electronic form), to generate (or determine) recommended entries for at least some of the other fillable fields on the electronic document. The recommended entries may be then rendered in the appropriate fields. In some embodiments, the recommended entries are (at least initially/temporarily) rendered in a manner different than the user-generated entry (or entries) (e.g., the recommended entries are shown in a different color than the user-generated entry).

In some embodiments, the user may then provide an indication as to whether or not he/she accepts or rejects the recommended entries. If accepted, the recommended entries may (then) be rendered in the same manner as the user-generated entry, and be made "permanent" entries (which may later be modified by the user in some embodiments).

In some embodiments, when the user is interacting with the electronic document (e.g., creating entries, correcting/updating entries, deleting entries, adding data, etc.), the system may react by creating candidate (or recommended) data or entries for the fillable fields based on the user-generated entries or changes, as well as the user's activity, information associated with user, etc., as described above. The system may utilize a self-learning functionality and/or may improve performance over time based on feedback provided by the user(s).

Biometric data, or any information associated with the user collected by various sensors, including data that may be utilized to detect or determine the mood of the user (e.g., via facial expressions, spoken words, etc.), may (also) be utilized to determine the recommended entries. Also, social media activity may also be utilized to determine the recommended entries and/or to store, categorize, and/or classify other data (e.g., for completing complicated forms or spreadsheets).

Figure 4:
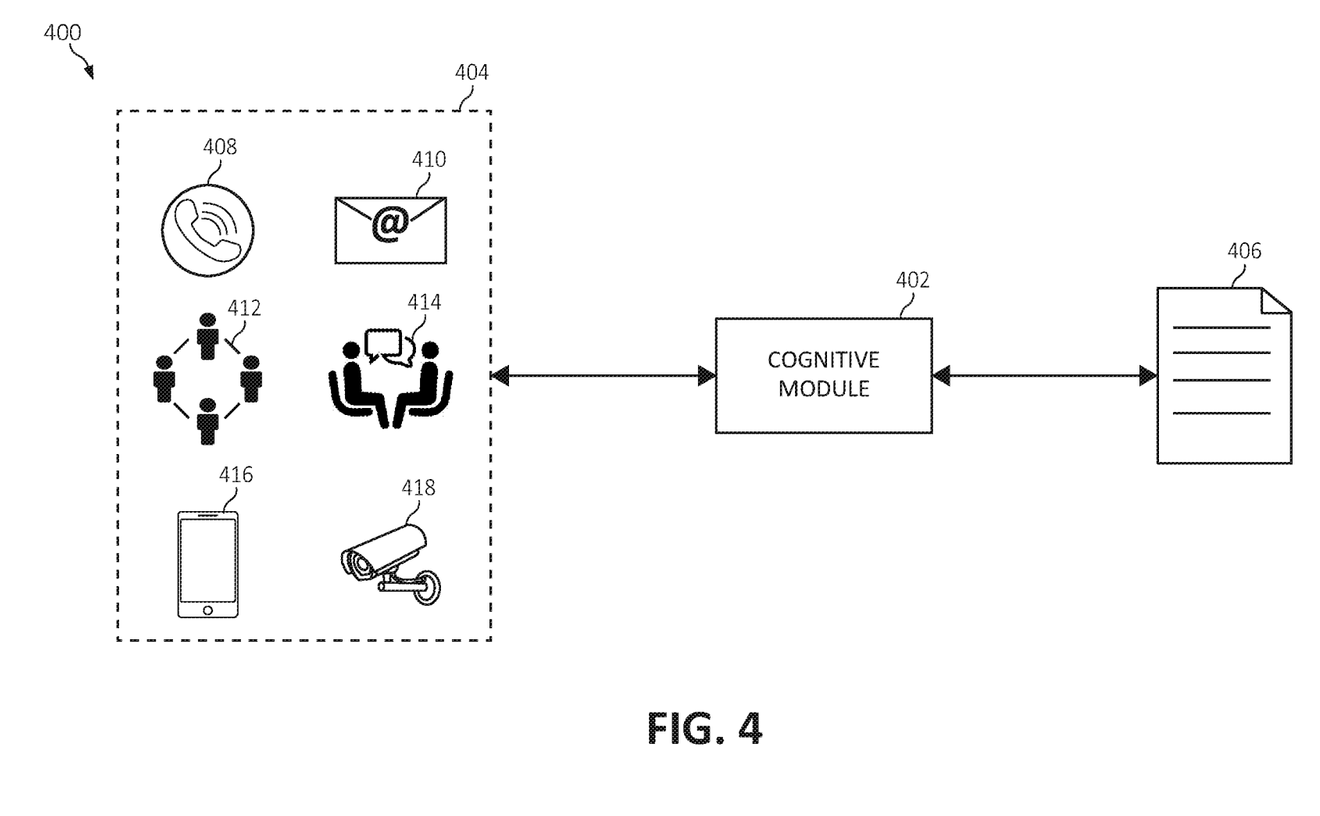
FIG. 4 is a simplified block diagram of a computing environment according to an embodiment of the present invention.

FIG. 4 illustrates an exemplary computing environment (or system) 400 according to some embodiments of the present invention. The environment 400 includes a cognitive module 402, data sources 404, and an electronic document 406. The cognitive module 402 may include (and/or be implemented with) any suitable computing device or system, such as those described above, and may be configured to perform the management of electronic documents, as described herein.

The data sources 404 may include multiple data sources that are associated with a user. In the example shown in FIG. 4, the data sources include telephone conversations 408, email(s) 410, social media activity 412, in-person conversations 414, a mobile electronic device, and a sensor 418. As such, the data sources 404 may include particular types of data associated with the user (e.g., emails, social media posts, etc.) and/or devices that may be utilized to collect or monitor data associated with the user. It should be understood that the data sources 408-418 shown in FIG. 4 are merely intended as examples, and other/additional data sources may be utilized in some embodiments, such as those described above (e.g., medical records, GPS data, etc.).

The electronic document 406 may include any document with one more fillable field thereon, which may be viewed on and interacted with via a computing device, such as a desktop PC, tablet device, laptop computer, mobile phone, etc. Examples include, but are not limited to, spreadsheets, word processing documents, and various types of forms (e.g., medical forms, government forms, online shopping/shipping forms, etc.). In some embodiments, the user may utilize the computing device to generate entries for the fillable fields (e.g., via a keyboard/text-based methods or voice commands). In some embodiments, the entries include alphanumeric characters (e.g., words, numbers, etc.). However, it should be understood that the entries may also include symbols and images (e.g., a fillable field requesting a recent photograph of the user). Further, it should be understood that the methods and system described herein may be applied to electronic forms that have "check boxes" (e.g., the form includes a question and provides various answers with check boxes next to each).

Still referring to FIG. 4, in some embodiments, when the cognitive module 402 detects that the user is interacting with the document 406 (e.g., the user has opened the document on a computing device and/or has generated an entry for one or more of the fillable fields thereon), the cognitive module 402 may utilize the data sources 404 and/or a profile (e.g., a cognitive profile) of the user generated therefrom to determine candidate (or recommended) entries for at least some of the fillable fields on the document 406, as described above. In some embodiments, the recommended entries are rendered (or displayed) in the appropriate fillable fields, perhaps in a manner different than any user-generated entries (e.g., a different color, different font type, etc.). The user may be provided with an option of whether or not to accept the recommended entries (e.g., one-by-one or as a group). If accepted, the recommended entries may be made "permanent" (and perhaps then rendered in the same manner as the user-generated entries). Feedback provided by the user (e.g., whether or not the recommended entries are accepted and/or explicit feedback provided in response to queries) may be used to improve the performance of the system over time (e.g., with respect to the same user or other users).

Figure 5:
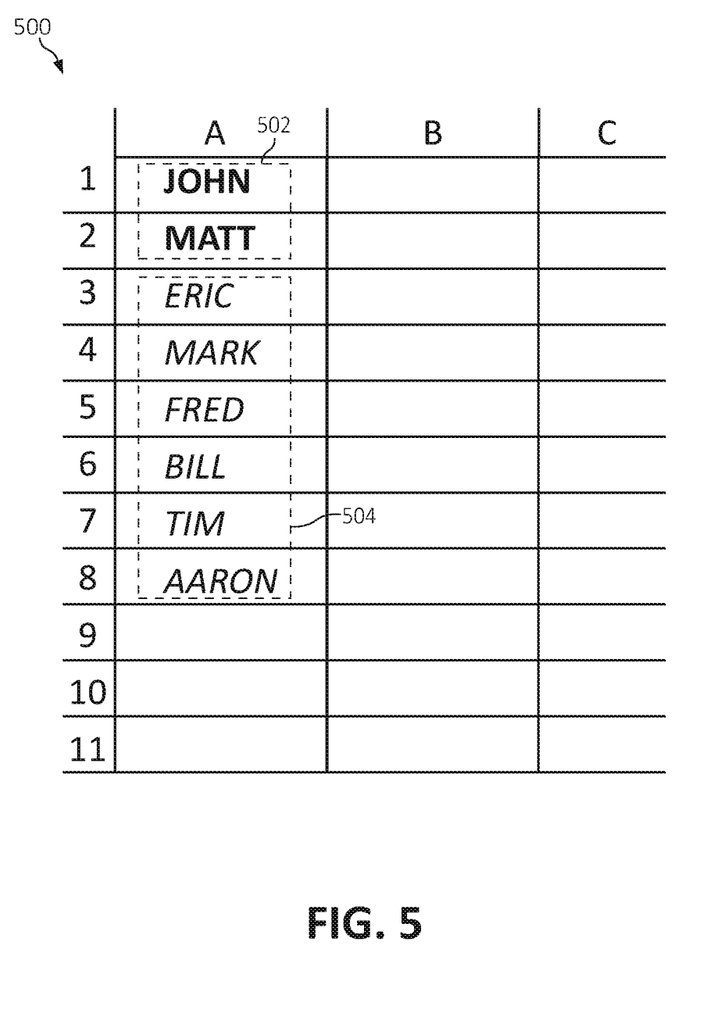
FIGS. 5 and 6 are plan views of a portion of an electronic document according to an embodiment of the present invention.

FIG. 5 illustrates a portion of an exemplary electric document 500 according to an embodiment of the present invention. It should be understood that the document 500 as shown in FIG. 5 may be intended to represent the document as it is displayed on a computing device, or simply provided for illustrative purposes. In the example shown, the document 500 is a spreadsheet with multiple columns (e.g., columns A, B, and C) and rows (e.g., rows 1-11) of fillable fields (or text boxes). As an example, it may be assumed that the user is utilizing the spreadsheet to generate a spending report associated with a trip or vacation that they have taken (or is going to take in the future) with a group of their friends. As such, the user is intending to create a spreadsheet that includes the names of the friends, items purchased on the trip, places visited, activities performed, etc., along with the costs of each (e.g., broken down per individual).

Still referring to FIG. 5, as shown, the user has generated entries (or user-generated entries) 502 for two of the fields (e.g., the names "John" and "Matt" in rows 1 and 2 of column A). In response, the system has determined recommended entries 504 for six of the fields (e.g., the names "Eric," "Mark," "Fred," "Bill," "Tim," and "Aaron" in rows 3-8 of column A). In such instances, the system may determine the recommended entries 504 based on the various data sources associated with the user (as described above) perhaps in combination with the user-generated entries 502. For example, if the user's emails or social media posts are determined to include discussions related to a trip that includes a group of the user's friends (e.g., as indicated by the recipients of the emails, comments on social media, etc.), and the names included in the user-generated entries 502 are determined to be within that group, the system may determine that the user is planning on listed all of the members of the group on the spreadsheet. As such, the recommend entries 504 may include the members of the group besides those already listed on the spreadsheet (i.e., within the user-generated entries 502).

Figure 6:
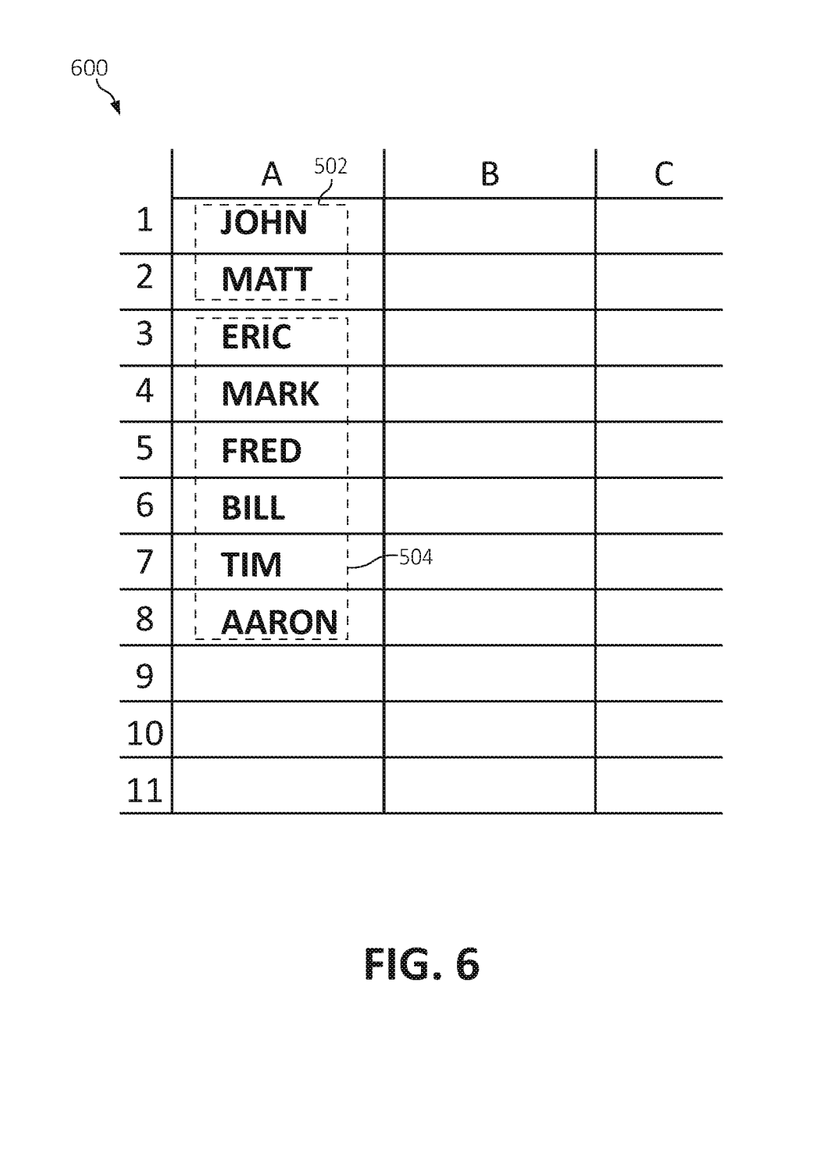

As mentioned above, in some embodiments, recommended entries are at least initially and/or temporarily rendered in a manner different than user-generated entries. For example, in FIG. 5, the user-generated entries 502 are rendered in relatively thick/dark, plain style characters, while the recommended entries 504 are rendered in thinner/lighter, italicized characters. In some embodiments, the recommended entries 504 may be rendered in this different manner until the user provides an indication of their accepted thereof, which may be performed in any suitable manner (e.g., the user "clicking" on the recommended entries with a cursor/mouse, via a keyboard, etc.). In embodiments that utilize such a feature, after the user has accepted the recommended entries 504, the recommended entries 504 may be rendered in the same manner as the user-generated entries 502, as shown in FIG. 6. In some embodiments, the user may make changes to the recommended entries 504 (e.g., including before and/or after the recommended entries are accepted). The changes made by the user may be utilized as feedback to improve the performance of the system.

In some embodiments, the computing device(s) and/or system(s) (and/or cognitive module) utilized to perform the functionality described herein may be understood to include an information engine, a data processing engine, and an implementation engine.

The information engine may collect and/or monitor data (or data sources) related to the user and/or the user's behavior, activities, interests, contextual situations, etc. This may include visual recognition and/or text recognition (e.g., NLP for keyword/highlight extraction and MFCC for speech recognition with speaker identification) performed via various devices, such as microphones and cameras associated with computing devices or other such information gathering means including activities (e.g., dining, hiking, traveling, etc.) performed as part of a cohort or group. As additional examples, wearable devices and sensors, along with social media information about the user, may also be utilized.

As one specific example, a user's mobile electronic device (e.g., a mobile phone) may be utilized to gather various types of information associated with the user. In such an instance, different sensors installed on and/or associated with device may work together to identify various types of information about the user. Examples include mobility pattern (e.g., locations traveled to, along with duration, speed, temperature, velocity, games played, activities performed, etc.), dining (e.g., type of food, costs, etc.), associated individuals (e.g., location tracking of multiple device and/or image analysis may be utilized to identify other individuals near/traveling with the user), and biometric data (e.g., heart rate, walking gate, etc.).

The information collected by the information engine may be stored in a database (e.g., a cloud database associated with the user). The data processing engine may make use of unstructured data collected from different sources and perform unsupervised learning, such as k-means clustering (as one example) in order to categorize the data, thereby aligning repetitive data and habits for accuracy and conformity. Hence, related/associated types of data (e.g., activities, interests, etc.) may be categorized within one objective output set with the respective information/keywords/highlights of the activity.

For example, the gathered data may be analyzed, including the identification of keywords, and categorized by names of individuals, food, activities, places, etc. Such may be stored in the database (e.g., associated with the user). Multiple instances of such relationships may be created and stored in user's device (and/or on the database).

As another example, the unstructured data may be assigned reconfigurable weights based on activities performed by the user and the repetitiveness of the activities in order to prioritize the activities and assign additional weight to the repetitive activities. Social aspects binding the activities may be annexed or combined in a conglomerate form with the activities. Other relevant data associated with the activities may be fetched from online ranking sources (e.g., newsfeeds, social media platforms, websites, etc.) in order to classify the data in (or convert the data to) a structured format. In such instances, the structured data may be classified using supervised machine learning algorithms, such as multi-level neural network classification or logistic regression with regularization.

Once the data processing engine has performed the processing steps and regularized the outputs in a format suitable for the user, the same data may be stored in a dynamic database (e.g., on the cloud). Continuous polling may be performed by the implementation engine to check the user's activity on the respective linked devices. Based on the polling, if the user is detected as opening an electronic document and/or beginning to generate entries for fillable fields with information determined to be related to a contextual situation that has been classified or categorized under separate information columns in the cloud database, it may be fetched dynamically and inserted into (or rendered in) the other fields. As such, the user may view or experience dynamic field auto-filling or output drive functionality, as performed by the implementation engine.

For example, when user begins writing a keyword in a fillable field, the system may identify other keywords that are related to the currently typed keyword, such as any other user-generated keyword, any contextual information identified during any discussion while typing, etc. Once the related keywords are identified, the system may auto-fill the keywords (or recommended entries) into the other (or at least some of the other) fillable fields on the electronic document. The user may be able to correct one or more of the recommended entries, which may be utilized as feedback (e.g., by a learning or self-learning module), and accordingly, the system may be trained with newly gathered information and new/additional rules for generating or determining the recommended entries may be created.

Additionally, in some embodiments, apart from the determining of recommended entries based on, for example, the various data sources associated with the user, the system may utilize machine learning techniques to predict possible new auto-fill contents (or recommend entries). Such may be used to remind the user to add additional contents to the electronic document (e.g., a spreadsheet).

Figure 7:
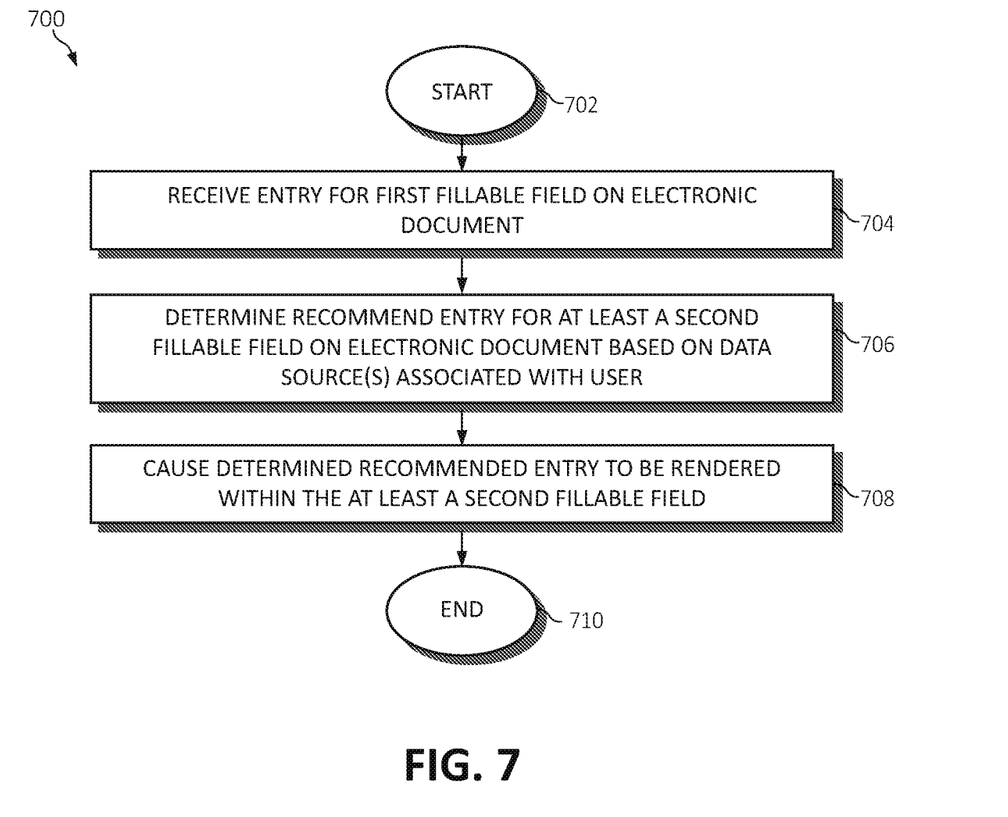
FIG. 7 is a flowchart diagram of an exemplary method for managing electronic documents according to an embodiment of the present invention.

Turning to FIG. 7, a flowchart diagram of an exemplary method 700 for managing electronic documents, in accordance with various aspects of the present invention, is provided. Method 700 begins (step 702) with, for example, a electronic document with a plurality of fillable fields (or text boxes) thereon, such as a spreadsheet or electronic form, being detected as being opened and/or rendered by a computing node (e.g., a desktop PC, tablet device, mobile phone, and/or a software application installed thereon).

An entry for a first of the plurality of fillable fields of (or on) the electronic document is received (or detected) (step 704). More specifically, a user-generated entry may be detected as being (at least partially) generated or composed within a first (or at least one of) the fillable fields. The user-generated entry may include alphanumeric characters and may be inputted by the user via text-based methods (e.g., a keyboard) or voice commands.

A recommended entry for at least a second (or at least some of the other) of the plurality of fillable fields is determined based on at least one data source associated with a user (step 706). The at least one data source may include structured data and/or unstructured data. Unstructured data may be converted into a structured format (or structured data). The determining of the recommended entry for the at least a second of the plurality of fillable fields may be further based on the received entry for the first of the plurality of fillable fields, performed utilizing a cognitive analysis, and/or or include determining a recommended entry for each of the others of the plurality of fillable fields (e.g., all of the fillable fields besides the fillable fields in which the user-generated entries were composed). The at least one data source associated with the user may include at least one of electronic communications, social media activity, and data collected by sensors.

The determined recommended entry for the at least a second of the plurality of fillable fields is caused to be rendered within the at least a second of the plurality of fillable fields (step 708). In some embodiments, the user is provided with an option to accept, reject, and/or modify the recommended entry (or entries), as described above.

Method 700 ends (step 710) with, for example, an indication of acceptance (or rejection or modification) of the determined recommended entry for the at least a second of the plurality of Tillable fields being received (or detected). The user's acceptance, rejection, and/or modification the recommended entries may be utilized as feedback to improve the performance of the system (e.g., the appropriateness and/or accuracy of the recommended entries) over time.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by one or more processors, for managing an electronic document comprising:

receiving an entry for a first of a plurality of fillable fields of an electronic document displayed by an electronic device;

determining data relevant to the electronic document in a plurality of data sources associated with a user, wherein the plurality of data sources comprise unstructured data and include an online data source and a local data source on the electronic device of the user, the local data source storing data collected from one or more sensors integrated into the electronic device, and wherein determining the relevant data includes identifying, by the electronic device, current location data of the user;

in conjunction with the identifying of the current location data of the user, utilizing the online data source to look up and translate business entity information corresponding to a business entity geographically positioned at the current location data of the user;

determining a recommended entry for at least a second of the plurality of fillable fields based on the plurality of data sources associated with the user, wherein the recommended entry is determined, at least in part, by identifying a contextual response for the second of the plurality of fillable fields according to the business entity information of the business entity correspondent to the current location data of the user to determine information anticipated to be required by the electronic document, wherein the information anticipated to be required by the second of the plurality of fields includes behavioral information of the user identified by the data collected from the one or more sensors over a previous defined timeframe, wherein the behavioral information includes symptoms of the user as deduced by movement and activity of the user determined through aural and spatial cues collected from the one or more sensors, notwithstanding whether the aural and spatial cues occurred at a location external to the business entity during the previous defined timeframe, and wherein the contextual response for the second of the plurality of fillable fields is further determined by spoken information, detected by the one or more sensors, from a spoken discussion between the user and an alternative user during a time window in which the user is performing the entry for the first of the plurality of fillable fields; and causing the determined recommended entry for the at least a second of the plurality of fillable fields to be rendered within the at least a second of the plurality of fillable fields.

2. The method of claim 1, further comprising converting the unstructured data into a structured format.

3. The method of claim 1, wherein the determining of the recommended entry for the at least a second of the plurality of fillable fields is further based on the received entry for the first of the plurality of fillable fields.

4. The method of claim 1, wherein the determining of the recommended entry for the at least a second of the plurality of fillable fields is performed utilizing a cognitive analysis.

5. The method of claim 1, wherein the determining of the recommended entry for the at least a second of the plurality of fillable fields includes determining a recommended entry for each of the others of the plurality of fillable fields.

6. The method of claim 1, wherein the plurality of data sources associated with the user further include at least one of electronic communications, and social media activity.

7. The method of claim 1, further comprising receiving an indication of acceptance of the determined recommended entry for the at least a second of the plurality of fillable fields.

8. A system for managing an electronic document comprising:
at least one processor that
receives an entry for a first of a plurality of fillable fields of an electronic document displayed by an electronic device;
determines data relevant to the electronic document in a plurality of data sources associated with a user, wherein the plurality of data sources comprise unstructured data and include an online data source and a local data source on the electronic device of the user, the local data source storing data collected from one or more sensors integrated into the electronic device, and wherein determining the relevant data includes identifying, by the electronic device, current location data of the user;
in conjunction with the identifying of the current location data of the user, utilizes the online data source to look up and translate business entity information corresponding to a business entity geographically positioned at the current location data of the user;
determines a recommended entry for at least a second of the plurality of fillable fields based on the plurality of data sources associated with the user, wherein the recommended entry is determined, at least in part, by identifying a contextual response for the second of the plurality of fillable fields according to the business entity information of the business entity correspondent to the current location data of the user to determine information anticipated to be required by the electronic document, wherein the information anticipated to be required by the second of the plurality of fields includes behavioral information of the user identified by the data collected from the one or more sensors over a previous defined timeframe, wherein the behavioral information includes symptoms of the user as deduced by movement and activity of the user determined through aural and spatial cues collected from the one or more sensors, notwithstanding whether the aural and spatial cues occurred at a location external to the business entity during the previous defined timeframe, and wherein the contextual response for the second of the plurality of fillable fields is further determined by spoken information, detected by the one or more sensors, from a spoken discussion between the user and an alternative user during a time window in which the user is performing the entry for the first of the plurality of fillable fields; and
causes the determined recommended entry for the at least a second of the plurality of fillable fields to be rendered within the at least a second of the plurality of fillable fields.

9. The system of claim 8, wherein the at least one processor further converts the unstructured data into a structured format.

10. The system of claim 8, wherein the determining of the recommended entry for the at least a second of the plurality of fillable fields is further based on the received entry for the first of the plurality of fillable fields.

11. The system of claim 8, wherein the determining of the recommended entry for the at least a second of the plurality of fillable fields is performed utilizing a cognitive analysis.

12. The system of claim 8, wherein the determining of the recommended entry for the at least a second of the plurality of fillable fields includes determining a recommended entry for each of the others of the plurality of fillable fields.

13. The system of claim 8, wherein the plurality of data sources associated with the user further include at least one of electronic communications, and social media activity.

14. The system of claim 8, wherein the at least one processor further receives an indication of acceptance of the determined recommended entry for the at least a second of the plurality of fillable fields.

15. A computer program product for managing an electronic document by one or more processors, the computer program product comprising a non-transitory computer-readable storage medium having computer-readable program code portions stored therein, the computer-readable program code portions comprising:
an executable portion that receives an entry for a first of a plurality of fillable fields of an electronic document displayed by an electronic device;
an executable portion that determines data relevant to the electronic document in a plurality of data sources associated with a user, wherein the plurality of data sources comprise unstructured data and include an online data source and a local data source on the electronic device of the user, the local data source storing data collected from one or more sensors integrated into the electronic device, and wherein determining the relevant data includes identifying, by the electronic device, current location data of the user;
an executable portion that, in conjunction with the identifying of the current location data of the user, utilizes the online data source to look up and translate business entity information corresponding to a business entity geographically positioned at the current location data of the user;
an executable portion that determines a recommended entry for at least a second of the plurality of fillable fields based on the plurality of data sources associated with the user, wherein the recommended entry is determined, at least in part, by identifying a contextual response for the second of the plurality of fillable fields according to the business entity information of the business entity correspondent to the current location data of the user to determine information anticipated to be required by the electronic document, wherein the information anticipated to be required by the second of the plurality of fields includes behavioral information of the user identified by the data collected from the one or more sensors over a previous defined timeframe, wherein the behavioral information includes symptoms of the user as deduced by movement and activity of the user determined through aural and spatial cues collected from the one or more sensors, notwithstanding whether the aural and spatial cues occurred at a location external to the business entity during the previous defined timeframe, and wherein the contextual response for the second of the plurality of fillable fields is further determined by spoken information, detected by the one or more sensors, from a spoken discussion between the user and an alternative user during a time window in which the user is performing the entry for the first of the plurality of fillable fields; and an executable portion that causes the determined recommended entry for the at least a second of the plurality of fillable fields to be rendered within the at least a second of the plurality of fillable fields.

16. The computer program product of claim 15, wherein the computer-readable program code portions further include an executable portion that converts the unstructured data into a structured format.

17. The computer program product of claim 15, wherein the determining of the recommended entry for the at least a second of the plurality of fillable fields is further based on the received entry for the first of the plurality of fillable fields.

18. The computer program product of claim 15, wherein the determining of the recommended entry for the at least a second of the plurality of fillable fields is performed utilizing a cognitive analysis.

19. The computer program product of claim 15, wherein the determining of the recommended entry for the at least a second of the plurality of fillable fields includes determining a recommended entry for each of the others of the plurality of fillable fields.

20. The computer program product of claim 15, wherein the plurality of data sources associated with the user further include at least one of electronic communications, and social media activity.

21. The computer program product of claim 15, wherein the computer-readable program code portions further include an executable portion that receives an indication of acceptance of the determined recommended entry for the at least a second of the plurality of fillable fields.

* * * * *